US009292080B2

(12) United States Patent
Pulapaka et al.

(10) Patent No.: US 9,292,080 B2
(45) Date of Patent: Mar. 22, 2016

(54) SELECTIVE BLOCKING OF BACKGROUND ACTIVITY

(71) Applicant: Microsoft Technology Licensing, LLC, Redmond, WA (US)

(72) Inventors: Hari Pulapaka, Redmond, WA (US); Alain Gefflaut, Kirkland, WA (US); Jon Robert Berry, Woodinville, WA (US); Emily Wilson, Seattle, WA (US); Qian Liu, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 217 days.

(21) Appl. No.: 13/922,104

(22) Filed: Jun. 19, 2013

(65) Prior Publication Data
US 2014/0380075 A1    Dec. 25, 2014

(51) Int. Cl.
*G06F 1/32* (2006.01)
(52) U.S. Cl.
CPC ............ *G06F 1/3293* (2013.01); *G06F 1/3206* (2013.01)
(58) Field of Classification Search
CPC .................................................... G06F 1/3206
See application file for complete search history.

(56) References Cited

U.S. PATENT DOCUMENTS

| 5,878,264 | A  | * | 3/1999  | Ebrahim ......................... 713/323 |
| 6,654,896 | B1 | * | 11/2003 | Saunders et al. ............... 713/323 |
| 6,931,553 | B1 | * | 8/2005  | Plante et al. ................... 713/310 |
| 7,478,186 | B1 |   | 1/2009  | Onufryk et al. |
| 7,505,753 | B2 |   | 3/2009  | Sorvari et al. |
| 2006/0206737 | A1 | * | 9/2006 | Lee ................................ 713/320 |
| 2012/0236834 | A1 |  | 9/2012  | Ho et al. |
| 2012/0260118 | A1 |  | 10/2012 | Jiang et al. |
| 2012/0303990 | A1 |  | 11/2012 | Nanda et al. |

FOREIGN PATENT DOCUMENTS

| EP | 2166457 A1 | 3/2010 |
| EP | 2490100 A1 | 8/2012 |

OTHER PUBLICATIONS

"International Search Report & Written Opinion for PCT Application No. PCT/US2013/061016", Mailed Date: Jul. 23, 2014, Filed Date: Sep. 20, 2013, 10 Pages.
"Background Networking", Published on: Feb. 24, 2012, Available at:      http://www.microsoft.com/en-us/download/confirmation.aspx?id=28999 33 pages.
"Being Productive in the Background—Background Tasks", Published on: May 25, 2012, Available at: http://blogs.msdn.com/b/windowsappdev/archive/2012/05/24/being-productive-in-the-background-background-tasks.aspx 11 pages.

(Continued)

*Primary Examiner* — Kim Huynh
*Assistant Examiner* — Eric Chang
(74) *Attorney, Agent, or Firm* — John Jardine; Judy Yee; Micky Minhas

(57) ABSTRACT

Controlling background activity in a computing device or system during a low-power mode is described. In some example techniques, when a computing device or system is in a low power mode, a determination is made whether to block one or more trigger events from causing an activation of one or more respective background task operations. Based at least in part on the determination, at least one trigger event may be allowed to cause an activation of a respective background task operation during the low power mode.

19 Claims, 8 Drawing Sheets

(56) References Cited

OTHER PUBLICATIONS

Speirs, Fraser, "How iOS Multitasking Really Works", Published on: Jan. 4, 2012, Available at: http://www.macworld.com/article/1164616/how_ios_multitasking_really_works.html 4 pages.

Whitwam, Ryan, "How to Optimize Startup and Background Tasks on Android", Published on: Aug. 5, 2010, Available at: http://www.tested.com/tech/android/660-how-to-optimize-startup-and-background-tasks-on-android/ 7 pages.

* cited by examiner

SELECTIVE BLOCKING OF BACKGROUND ACTIVITY

BACKGROUND

Computing devices have become commonplace in almost every environment. For example, mobile telephones, laptop computers, and tablet computers are commonly used for work and pleasure, and accompany people in many daily activities. Further, people often travel with computers and mobile phones, bring these devices to school, and use these devices in public places. These electronic devices communicate with a communications infrastructure to enable the consumption of digital media items, such as documents, images, music, and videos. In view of the widespread use of computing devices, providing both power savings and a better user experience has become a priority.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Some implementations provide techniques and arrangements for controlling background activity in a computing device or system during a low-power mode. For instance, in some implementations, when a computing device or system is in a low power mode, a determination is made to block certain trigger events from causing activation of background task operations while allowing other trigger events to cause activation of background task operations during the low power mode.

BRIEF DESCRIPTION OF THE DRAWINGS

The Detailed Description is described with reference to the accompanying figures. The use of the same reference numbers in different figures indicates similar or identical items.

DETAIL DESCRIPTION

Overview

Figure 1:
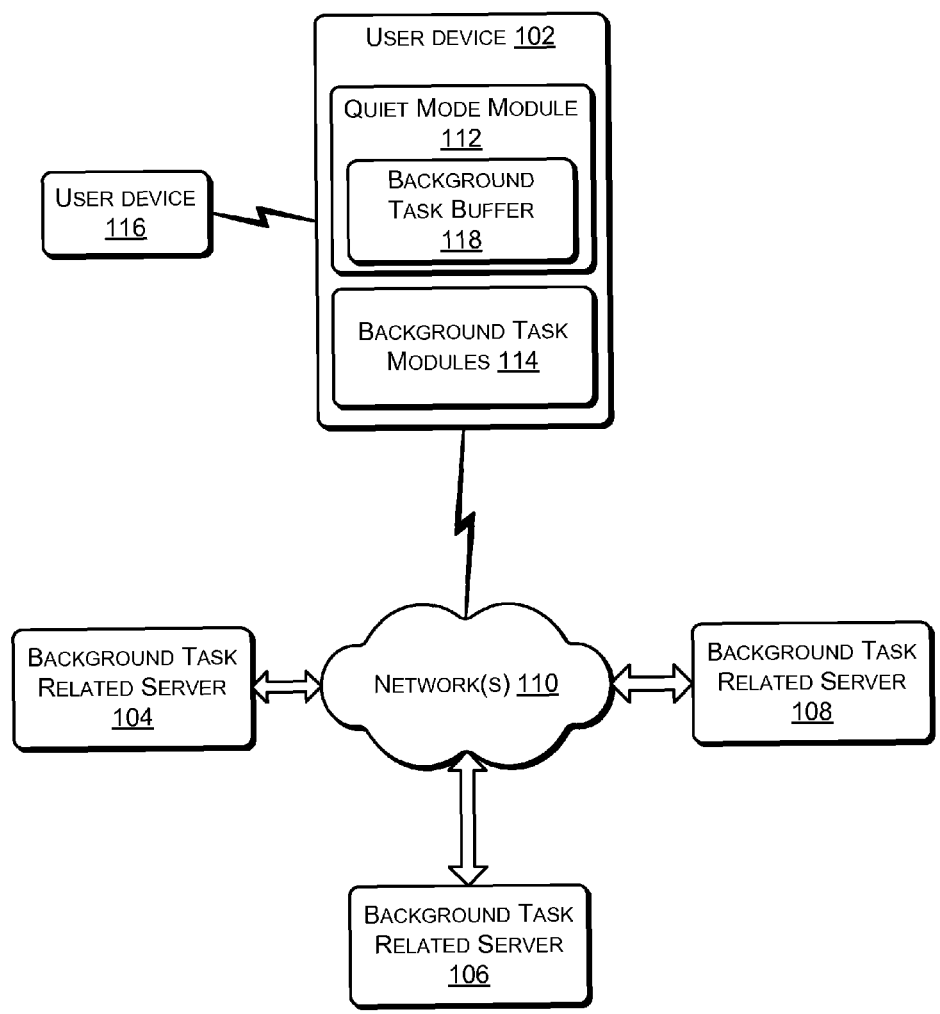
FIG. 1 is a schematic diagram of an illustrative computing architecture.

This disclosure includes techniques and arrangements for the selective blocking of background activity in computing devices. In some implementations, the techniques and arrangements may provide functionality to differentiate between background tasks and selectively execute or block and/or buffer the tasks. In some implementations, the selective blocking of background activity may occur when the computing device is in a quiet mode which may be a low-power mode and/or a mode in which at least some outputs are suppressed (e.g., suppressed outputs may include notification sounds for blocked background activity, turning on of the display for blocked background activity, etc.). In some implementations, the quiet mode is entered when user interaction has not occurred for a period of time. For example, a computing device may enter quiet mode when user activity has not been detected for five minutes. Further, in some implementations, quiet mode may be entered during a defined quiet mode time period. For example, in some implementations, a quiet mode time period may be between 12:00 AM and 6:00 AM. In some implementations, during the quiet mode time period, if user interaction is not detected for some period of time, the default treatment of background activity may be to block and buffer trigger events of the background activity. In some implementations, a quiet mode may be a type of connected standby in which at least some background activity tasks allow the device to stay connected to remote devices.

In some implementations, a user of the computing device may be provided with a user interface through which the user is able to select background activities (or the corresponding trigger events) which are to be allowed to execute during the quiet mode period. For example, a user may wish to be able to receive VoIP calls and instant messages during the quiet mode period. Using the aforementioned user interface, the background task activities related to VoIP calls and instant messages could be selectively allowed to execute and, in some implementations, allowed to cause the computing device to exit quiet mode.

In some implementations, the techniques and arrangements disclosed herein may further provide functionality for selectively buffering trigger events related to selectively blocked background activities. For example, in a scenario in which the background activity of periodically checking an e-mail account is blocked, some implementations may provide for at least some of the blocked trigger events that cause the periodic checking for new mail to be buffered. The techniques and arrangements disclosed herein may further provide for a buffering policy that may, for background tasks that have multiple occurrences of trigger events during an instance of quiet mode, selectively drop or keep different or all of the multiple occurrences as the trigger events occur.

The discussion herein refers to the selective blocking and buffering of trigger events. In some implementations, the buffering of trigger events may include buffering some form of a message or other triggering signal. For example, in a scenario in which the blocked and buffered trigger event is related to an incoming instant message received while a quiet mode is active, some implementations may buffer the incoming instant message communication without further processing. However, implementations are not so limited and the particulars used in implementing the buffering of trigger events may vary from implementation to implementation. For example, in some implementations, upon receiving a trigger event that is to be blocked and buffered, the receiving system may perform various amounts of processing such as determining the background task operations that are executed as a result of the trigger event and buffer the determined background task operations instead of or in addition to the received trigger event. More particularly, in a scenario involving the aforementioned instant message communication to be blocked, rather than buffer the incoming communication from an instant message server, the system may buffer the application level operations of the instant message application that are to be executed as a result of the trigger event. These and other example techniques are referred to herein as buffering of the trigger event.

Although the discussion herein may describe implementations in which the computing device is a user device, implementations are not so limited and the techniques and methods discussed herein may be applied to other computing devices such as servers, network devices, etc.

The selective blocking of background activity described herein may be implemented at various levels in the software and hardware of computing systems. Such levels include the Operating System (OS) level, such as in the OS with or without application support, the application level, either separate from the OS (i.e. stand-alone) or as a plug-in to the OS or a plug-in to another application and so forth.

It should also be noted that, for readability, interactions between modules may be described herein as signals or commands, but such interactions may be implemented in various ways, such as by function calls between various program modules.

FIG. 1 is a schematic diagram of an illustrative computing architecture 100. The computing architecture 100 may include a user device 102 capable of communicating with one or more background task related servers 104, 106 and 108 via a network(s) 110 (e.g., public network such as the Internet or private network such as a local area network (LAN)).

The user device 102 may be variously configured with different functionality to enable consumption of one or more types of media items. The media items may be any type of format of digital content, including, for example, electronic texts (e.g., eBooks, electronic magazines, digital newspapers, etc.), digital audio (e.g., music, audio books, etc.), digital video (e.g., movies, television, short clips, etc.), images (e.g., art, photographs, etc.), and multi-media content. The user device 102 may include any type of content rendering devices such as electronic book (eBook) reader devices, portable digital assistants, mobile phones, laptop computers, portable media players, tablet computers, cameras, video cameras, netbooks, notebooks, desktop computers, gaming devices or consoles, DVD players, media centers, and any other computing device. The user device may further include a quiet mode module 112 and one or more background task modules 114.

The background task related servers 104-108 and the user device 102 deliver and/or receive items, upgrades, and/or other information via the network(s) 110. For example, the user device 102 may download or receive items from the background task related servers 104-108. The background task related servers 104-108 may also receive various requests, instructions and other data from the user device 102 via the network(s) 110. The background task related servers 104-108 may include one or more machines (e.g., one or more server computer systems, routers, gateways, etc.) that have processing and storage capabilities to provide the above functionality.

Communication between the background task related servers 104-108 and the user device 102 may be enabled via any communication infrastructure. One example of such an infrastructure includes a combination of a wide area network (WAN) and wireless infrastructure, which allows a user to use the user device 102 to purchase items and consume items without being tethered to the background task related servers 104-108 via hardwired links. The wireless infrastructure may be provided by one or multiple wireless communications systems. The wireless communication systems of the network(s) 110 may be a wireless fidelity (Wi-Fi) hotspot connected with the user device 102 and/or one or more of the background task related servers 104-108. Other wireless communication systems may include a wireless carrier system that can be implemented using various data processing equipment, communication towers, etc. Alternatively, or in addition, the wireless carrier system may include satellite technology to exchange information with the user device 102.

The communication infrastructure of the network(s) 110 may also include communication-enabling systems that serve as an intermediary in passing information between the background task related servers 104-108 and any wireless communication system(s). In one example, the communication-enabling system may communicate with the wireless communication system (e.g., a wireless carrier) via a dedicated channel, and may communicate with the background task related servers 104-108 via a non-dedicated communication mechanism, e.g., a public Wide Area Network (WAN) such as the Internet.

In addition to wirelessly connecting to a wireless communication system of the network(s) 110, the user device 102 may also wirelessly connect with other user devices (e.g., another user device 116). For example, user device 102 may form a wireless ad hoc (peer-to-peer) network with one or more other user devices 116.

As mentioned above, the user device may include a quiet mode module 112 and one or more background task modules 114. In some implementations, the quiet mode module 112 may operate to control at least some activity of the user device 102 related to a "quiet mode," which may comprise a connected standby mode. The background task modules 114 may perform background activities such as downloading e-mail, maintaining server connections, receiving VoIP calls or instant messages, and so on. At least some of the background task modules 114 may perform background tasks that may, if otherwise allowed, be triggered and executed during the quiet mode. The quiet mode module 112 may operate to control which triggered background tasks are allowed to execute during the quiet mode. The quiet mode module may also operate to buffer at least some triggered background task activity in a background task buffer 118 such that buffered triggers may be executed after quiet mode is exited. As mentioned previously, in some implementations, the quiet mode module may provide buffering functionality which operates according to a buffering policy to selectively buffer blocked triggers. Additional discussion of the functionality of the quiet mode module is provided with reference to FIGS. 2-8.

Although the preceding and following discussion refers to "transmitting" and "transmission," which may be implemented by a transceiver or a transmitter, implementations may also cover operations of receivers, where appropriate. Further, implementations are not limited to wireless devices. Rather, devices with wired networking or which are devoid of networking capability are also contemplated as within the scope of this disclosure.

The above discussion provides many details and examples related to FIG. 1 and the disclosed systems and techniques in general. However, the above discussion is not limiting and many variations are possible and will be appreciated in view of this disclosure.

Figure 2:
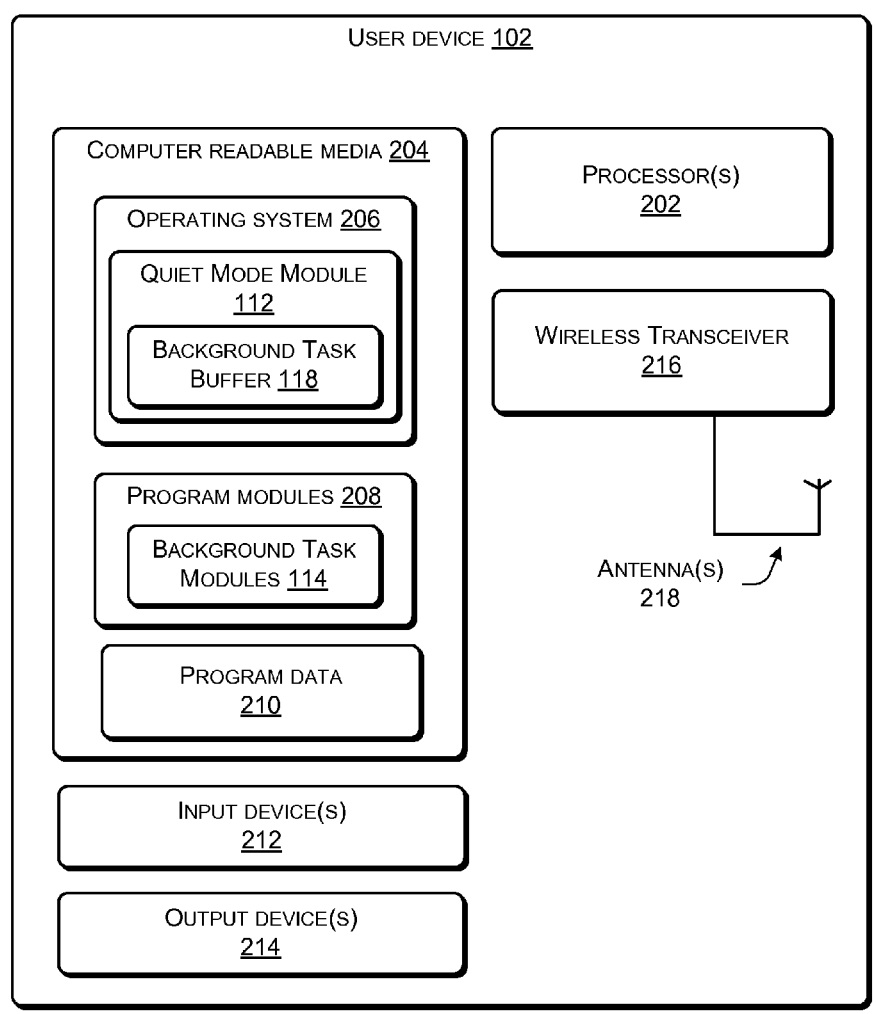
FIG. 2 is a block diagram of an illustrative user device.

FIG. 2 is a block diagram 200 illustrating an exemplary configuration of the user device 102 of FIG. 1. The user device 102 includes one or more processors 202. The processor(s) 202 can be implemented as one or more microprocessors, microcomputers, microcontrollers, digital signal processors, central processing units, state machines, logic circuitries, and/or any devices that manipulate signals based on operational instructions. Among other capabilities, the processor 202 can be configured to fetch and execute computer-readable instructions stored in the computer-readable media 204.

The user device 102 also includes computer-readable media 204. The computer-readable media 204 stores information which provides an operating system component 206 that may include the quiet mode module 112, various program modules 208 such as the background task modules 114, program data 210, and/or other components. In one example, the user device 102 performs functions by using the processor(s) 202 to execute instructions provided by the computer-readable media 204.

As used herein, "computer-readable media" includes, at least, two types of computer-readable media, namely computer storage media and communications media.

As used herein, computer storage media or computer-readable storage media may correspond to any combination of volatile and/or non-volatile storage mechanisms. Depending on the configuration of the user device 102, the computer-readable media 204 may be an example of a computer storage media for storing instructions which are executed by the processor 202 to perform the various functions described herein. For example, the computer-readable media 204 may generally include both volatile memory and non-volatile memory (e.g., RAM, ROM, or the like). Further, the computer-readable media 204 may generally include hard disk drives, solid-state drives, removable media, including external and removable drives, memory cards, flash memory, floppy disks, optical disks (e.g., CD, DVD), a storage array, a network attached storage, a storage area network, or the like. The computer-readable media 204 may be referred to as memory or computer storage media herein, and may be a media capable of storing computer-readable, processor-executable program instructions as computer program code that can be executed by the processor 202 as a particular machine configured for carrying out the operations and functions described in the implementations herein.

In contrast, communication media embody computer readable instructions, data structures, program modules, or other data in a modulated data signal, such as a carrier wave, or other transmission mechanism. As defined herein, computer storage media does not include communication media.

The user device 102 may also include one or more input devices 212 (keyboard, mouse device, specialized selection keys, a touchscreen display 104 which may operate in response to touches, gestures, etc.) and one or more output devices 214 (a display (touchscreen or otherwise), printers, audio output mechanisms, etc.).

The user device 102 further includes a wireless transceiver 216 to allow the user device 102 to communicate via a wireless network (e.g., such as the network(s) 110) with other computing devices, such as remote computers, the background task related servers 104-108 and so forth. The wireless transceiver 216 allows the user device 102 to handle both voice and non-voice communications (such as communications for text messages, multimedia messages, media downloads, web browsing, etc.) with the network(s) 110. The wireless transceiver 216 may provide network connectivity using any type of mobile network technology including, for example, cellular digital packet data (CDPD), general packet radio service (GPRS), enhanced data rates for GSM evolution (EDGE), universal mobile telecommunications system (UMTS), 1 times radio transmission technology (1×RTT), evaluation data optimized (EVDO), high-speed downlink packet access (HSDPA), Wi-Fi, etc.

The wireless transceiver 216 may generate signals, after which they are wirelessly transmitted via the antenna(s) 218. If multiple antennas 218 are included, the antenna(s) 218 may be configured to transmit in different frequency bands and/or using different wireless communication protocols. The antenna(s) 218 may be directional, omnidirectional or non-directional antennas. In addition to sending data, the antenna(s) 218 may also receive data, which is sent to wireless transceiver 216 and transferred to processor(s) 202 and computer-readable media 204.

Although a single wireless transceiver 216 is shown to control transmission to antenna(s) 218, the user device 102 may alternatively include multiple wireless transceivers, each of which is configured to transmit data via a different antenna 218 and/or wireless transmission protocol.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art in view of this disclosure. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Figure 3:
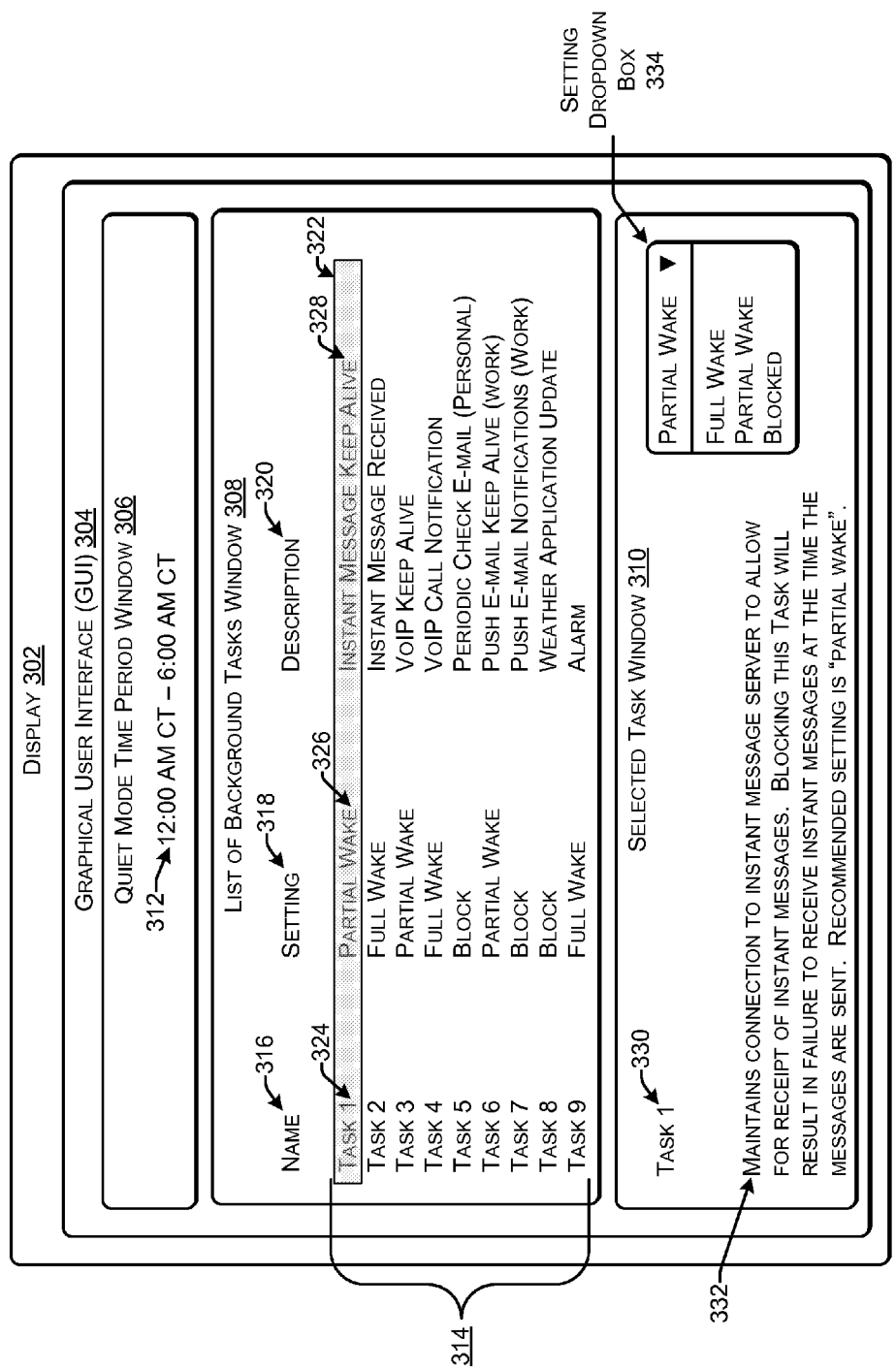
FIG. 3 illustrates an example graphical user interface that may enable a user to adjust settings for a quiet mode on a computing device.

FIG. 3 illustrates an example view 300 of a display 302 shelling a graphical user interface (GUI) 304 according to some implementations that may be utilized by a user to adjust the settings for a quiet mode of a computing device. As illustrated in FIG. 3, the GUI 304 may include a quiet mode time period window 306, a list of background tasks window 308 and a selected task window 310.

The quiet mode time period window 306 may allow for a user to view and/or set a quiet mode time period 312 during which the computing device may enter quiet mode if user interaction is not detected for some time (e.g. an idle time period). In some implementations, the time period 312 may be derived based on an analysis of user interactions with the particular computing device. In such implementations, the analysis may determine that during one or more periods of time in each day of the week a user is less likely to utilize the computing device and set the determined periods of time as the quiet mode time period(s) for the computing device. For example, the user may set or the computing device may determine the quiet mode time period to be between the hours of 12:00 AM CT and 6:00 AM CT. However, as mentioned above, the quiet mode time period(s) need not be contiguous. For example, an analysis by the computing device may determine that user interactions do not often occur during the day or late at night (e.g., the user does not use the device while at work or while asleep). As such, the computing device may determine that two quiet mode time periods are appropriate, one from 10:00 AM to 4:00 PM and another from 12:00 AM to 6:00 AM. Similar settings may be provided by the user in some implementations.

The list of background tasks window 308 includes a list 314 of background tasks registered with the computing device which may be triggered during the quiet mode time period 312. As shown in FIG. 3, the list 314 includes three columns: a name column 316; a setting column 318; and a short description column 320. The list of background tasks window 308 may further include a selection indicator 322 that indicates the currently selected task in the list 314. The selected task is shown at 324 to be named "Task 1." Of course, as would be understood by one of ordinary skill in the art in view of this disclosure, the name "Task 1" is merely used herein for ease of explanation and comprehension. In some implementations, the name column 316 may set forth a technical task title, such as the process name, a filename of a parent task and so on. As shown at 326, "Task 1" is set to be able to partially wake the computing device during quiet mode. The distinction between fully waking and partially waking the computing device during quiet mode will be discussed in more detail with regard to FIGS. 5-7 below. In summary, a background task set to partially wake the computing device during quiet mode is allowed to execute during quiet mode without being blocked but is not allowed to wake the device enough to cause other previously blocked and buffered tasks to be executed. In contrast, a background task set to fully wake the computing device is allowed to execute during quiet mode and also allows for other buffered tasks that were previously blocked to be executed. As shown at 328, the short description of the selected task is "Instant Message Keep Alive." In other words, the description indicates that Task 1 is a background task responsible for performing keep alive functions for an instant messenger application.

The selected task window 310 includes a selected task name area 330, detailed description area 332 and a setting drop-down box 334. As previously discussed, the selected task is Task 1. As such, at 330, the name "Task 1" appears. The detailed description area 332 of the selected task window 310 includes a verbose description of the function of the selected task. In the illustrated example, the detailed description at 332 provides warnings and recommendations for the setting of the selected task. In particular, as shown in FIG. 3, the detailed description at 332 indicates that the recommended setting is "partial" because blocking the task will result in a failure to receive instant messages at the time the messages are sent. The setting drop-down box 334 allows for a user to set the quiet mode functionality for the selected task. As illustrated in FIG. 3, the setting drop-down box 334 allows for a user to choose to allow the background tasks to fully wake the computing device, partially wake the computing device or be blocked during quiet mode.

Figure 4:
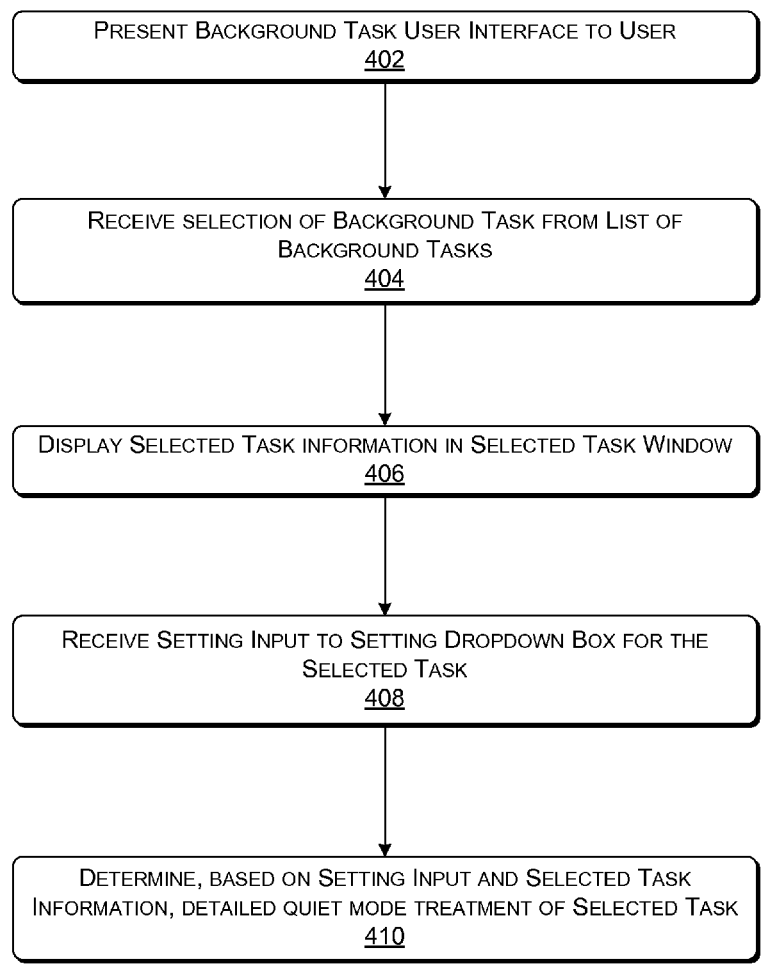
FIG. 4 illustrates an example process flow according to some implementations for determining the treatment of background tasks during a quiet mode on a computing device.

FIG. 4 illustrates an example process flow 400 according to some implementations. In particular, FIG. 4 illustrates an example process flow by which a computing device may accept input of settings by a user for the treatment of background tasks in a quiet mode. For example, the process flow 400 may be utilized with respect to the GUI 304 illustrated in FIG. 3. In the flow diagrams of FIG. 4, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the process 400 is described with reference to the computing device 102, described above, although other models, frameworks, systems and environments may implement the illustrated process. Other processes described throughout this disclosure (e.g. FIGS. 4-8), shall also be interpreted accordingly.

At 402, a background task user interface is presented to a user (e.g., in response to a user input requesting the display of the user interface). As mentioned above, the background task user interface may be or may be similar to the graphic user interface 304.

At 404, the user device 102 receives a selection through the background task user interface of a background task from a list of background task. For example, the selection may be or may be similar to the selection of Task 1 as shown in and described above with respect to FIG. 3.

At 406, the selected task information may be displayed in a selected task window of the background task user interface. For example, the selected task window may be or may be similar to the selected task window 310 as shown in and described above with respect to FIG. 3.

At 408, the user device 102 may receive a setting input for the selected task at a setting drop-down box of the selected task window. For example, the setting drop-down box may be similar to the setting drop-down box 334 shown in FIG. 3.

Finally, at 410, the computing device may determine, based on the received setting input and information about the selected task, the detailed quiet mode treatment of the selected task. Such a detailed quiet mode treatment may vary from task to task. For example, in the case of a task for periodically checking an e-mail account for new e-mails and a task for notifying of entering new wireless network areas, multiple trigger events may occur for the background tasks throughout an instance of quiet mode. For the periodic checking of the e-mail account, the detailed quiet mode treatment may include blocking the trigger events and buffering the first blocked trigger event. Subsequent trigger events may be discarded. On the other hand, for the trigger events alerting of the entry to new wireless network areas, the trigger events may be blocked but older trigger events may no longer be of use if the computing device has left the corresponding network areas. As such, as events notifying of entering the network areas occur, previous trigger events may be removed from the buffer and replaced with the most recent trigger event. Of course, these are merely examples and, depending on the particular implementation, different treatment may be applied (e.g. buffering all trigger events regardless of specifics of the background task). Additional details regarding specific treatment of trigger events is provided with regard to FIGS. 5-7.

Figure 5:
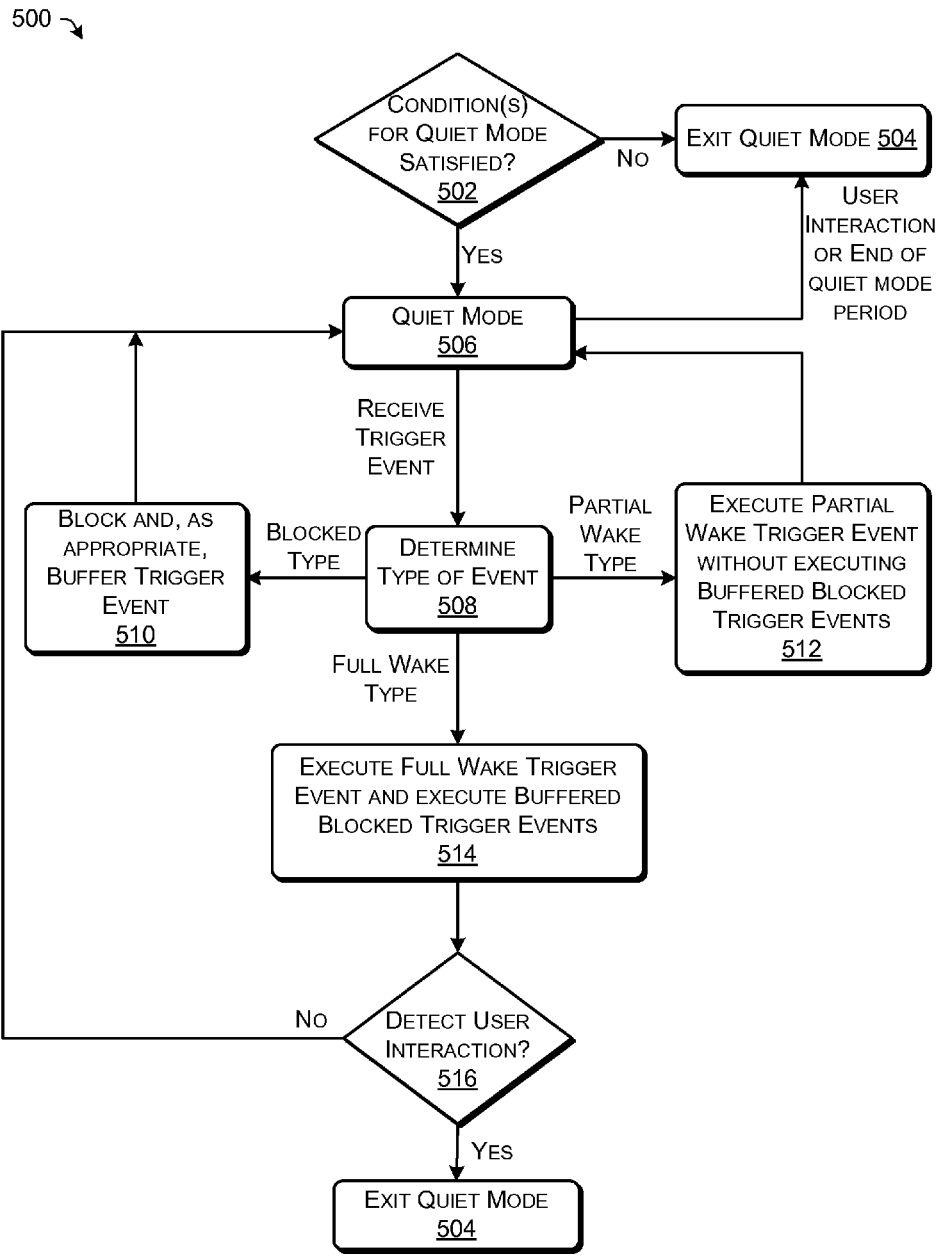
FIG. 5 illustrates an example process flow according to some implementations for the treatment of trigger events that activate background task operations during a quiet mode on a computing device.

FIG. 5 illustrates an example process flow 500 according to some implementations. In particular, FIG. 5 illustrates an example process flow by which a computing device may respond to trigger events during an instance of quiet mode. For example, the process flow 400 may be utilized with respect to the user device 102 illustrated in FIGS. 1 and 2.

At 502, a quiet mode module may determine whether the condition(s) for quiet mode are satisfied. For example, in some implementations, the conditions set for entry to the quiet mode may be that the user has not interacted with the device for five minutes and the time of day is within the quiet mode time period. If the conditions are not satisfied, the process moves to 504 at which point the quiet mode routine is exited. If the conditions are satisfied, the process moves to 506.

At 506, the process enters quiet mode. While in the state represented by 506, if user interaction is detected or the quiet mode time period ends, the process may go to 504, at which point, the quiet mode is exited. As mentioned previously, FIG. 5 relates to the operations that occur when a trigger event is received or otherwise occurs during an instance of quiet mode. More details regarding the operations at 506 in the absence of trigger events, user interaction or the end of the quiet mode time period is provided with regard to FIG. 7. When a trigger event is received, the process moves to 508.

At 508, the quiet mode module determines the type of trigger event that has been received or that has otherwise occurred. For ease of discussion, trigger events are discussed here in with respect to the three general types set forth with regard to FIG. 3, that is: a block type, a partial wake type and a full wake type. Of course, as would be recognized by one of ordinary skill in the art in view of this disclosure, trigger events are not limited to these three general types and many variations on the typing or categorization of trigger events and treatment of the trigger events are possible. If the received trigger event is of the block type, the process moves to 510. If the trigger event in of the partial wake type, the process moves to 512. If the trigger is of the full wake type, the process moves to 514.

At 510, the received trigger event is blocked and as appropriate, placed in a trigger event buffer. For example, in an implementation in which the quiet mode module 112 performs the process flow 500, the quiet mode module 112 may block the received trigger event and, as appropriate, buffer the trigger event in the background task buffer 118. Some discussion of when blocked trigger events are buffered was provided with regard to FIG. 4. Additional discussion of the buffering of trigger events that are blocked is provided below with regard to FIG. 6. Once operations at 510 are completed, the process returns to 506.

At 512, the received partial wake type trigger event is executed or otherwise allowed to proceed to cause the activation of the corresponding background task operation, hereinafter referred to as executing the trigger event. As discussed previously, partial wake type trigger events may be allowed to execute but not to cause a computing device to execute previously blocked and buffered trigger events. For example, in an implementation in which the quiet mode module 112 performs the process flow 500, the quiet mode module 112 may allow the partial wake type trigger event to be executed but does not allow trigger events in the background task buffer 118 to be executed. The quiet mode module 112 may also limit the effects of a partial wake type trigger event on the computing device. For example, the quiet mode module may prevent partial wake type trigger events from causing outputs such as notification sound, turning on a display screen or other effects that may be disruptive to the user desiring the device to be quiet. In a more particular example, a partial wake type trigger event may be the previously discussed change of network area trigger event. In such a case, the user may desire the device to execute the trigger event but not output notification sounds or turn on a display screen. Once operations at 510 are completed, the process returns to 506.

At 514, the received full wake type trigger event may be executed. As discussed, the quiet mode module may allow for the execution of previously blocked and buffered trigger events upon receiving and executing a full wake type trigger event. For example, a user device may be set to treat voice over IP (VoIP) calls as full wake type trigger events. Upon receiving a trigger event notifying of an incoming VoIP call from a VoIP server, the VoIP call trigger event is determined to be a full wake type trigger event. As such, the VoIP call is allowed to fully execute without restrictions (e.g., allowed to turn on the screen and play a ring tone associated with the VoIP call). In some implementations, previously blocked and buffered trigger events are removed from the buffer (e.g., background task buffer 118) and executed. Depending on the implementation, the specific treatment and execution of the buffered trigger events may vary. For example, in some implementations, all buffered trigger events may be allowed to execute. In other implementations, the execution of buffered trigger events may be limited to those that are able to execute during the execution of the full wake type trigger event. For example, in some implementations, upon receipt of a VoIP call, the quiet mode module 112 may pop trigger events off the background task buffer 118 in the manner of a last-in-first-out queue and execute the popped trigger events while the ring tone is being played. If the user does not interact with the device and the call goes unanswered, at the end of the trigger event for the VoIP call, execution of trigger events remaining in the buffer may stop. Of course, the specific treatment of buffered trigger events during the full wake type trigger event given above is merely an example and may be varied from implementation to implementation (e.g., buffered trigger events may be taken in a different order). Following operations at 514, the process flow 500 moves to 516.

As alluded to above, at 516, following the execution of a full wake type trigger event, quiet mode module 112 may determine whether or not user interactions were detected. If so, the process flow may move to 504 and the quiet mode may be exited entirely. Otherwise, the process flow 500 may return to 506 to immediately reenter quiet mode without having to re-satisfy the conditions for quiet mode (e.g., not have to wait a period of time without user interaction before re-entering quiet mode).

While a particular procedure for implementing the treatment of trigger events received during a quiet mode is discussed with regard to FIG. 5, other procedures may be used and would be apparent to one of ordinary skill in the art in view of this disclosure. In particular, variations on the number of types and categorization of the types of trigger events discussed above is possible and may be driven by considerations of particular implementations. For example, some implementations may operate without a distinction between partial wake type trigger events and full wake type trigger events. In a particular variation, all wake type trigger events may be treated as partial wake type trigger events such that previously blocked and buffered trigger events are not executed until quiet mode is exited. More concretely, in the above-described example, upon receipt of the voice over IP call, previously buffered trigger events would not be executed. Rather, the buffered trigger events would be executed upon detection of user interaction or the end of the quiet mode time period. These and other variations on the details of the procedure would be apparent to one of ordinary skill in the art in view of this disclosure.

Figure 6:
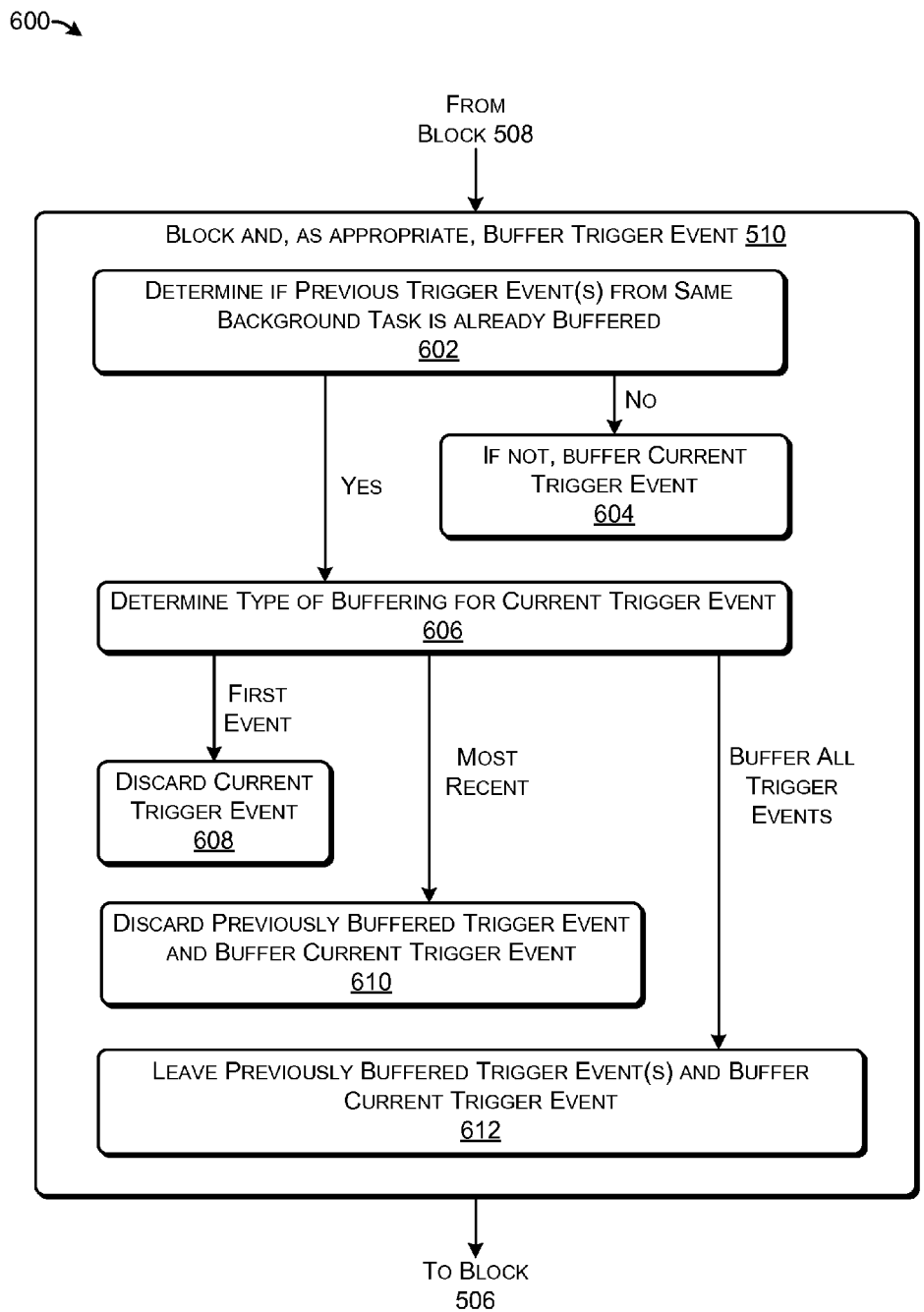
FIG. 6 illustrates an example process flow according to some implementations for determining whether to buffer a blocked trigger event during a quiet mode on a computing device.

FIG. 6 illustrates an example process flow 600 according to some implementations. In particular, as mentioned above, FIG. 6 illustrates an example process flow for performing operations discussed with regard to 510 of FIG. 5. Specifically, the illustrated implementation of the operations of 510 shown in FIG. 6 provides for the detailed treatment of blocked trigger events according to some implementations. The process flow 600 is discussed below in the context of the user device 102 illustrated in FIGS. 1 and 2 or more generically in the context of a computing device. As shown in FIG. 6 and discussed previously with regard to FIG. 5, the operations of 510 begin after determination at 508 that a trigger event is of a blocked type.

At 602, the quiet mode module 112 determines if a previous trigger event of the same background task as the current trigger event is already buffered in the background task buffer 118. If not, at 604, the current trigger event is buffered. Otherwise, the process moves to 606.

At 606, the quiet mode module 112 determines the type of buffering applicable to the current trigger event. As discussed previously rumored FIG. 4, the buffering treatment appropriate for trigger events varies between background tasks (e.g., the treatment appropriate for periodic e-mail checks versus the treatment appropriate for notifications that a new network area has been entered). As shown in FIG. 6, three general treatment types are considered, namely, a "buffer the first trigger event" treatment, a "buffer the most recent trigger event" treatment and a "buffer all trigger events" treatment. If the current trigger event is of the buffer the first trigger event type, the process moves to block 608. If the current trigger is of the buffer the most recent trigger event type, the process moves 610. If the current trigger event is of the buffer all trigger events type, the process moves to 612.

At 608, the current trigger event is discarded. In particular, as a previous trigger event of the same background task is already buffered (as determined at 602), a first trigger event is already buffered and thus the current trigger event is not the first trigger event.

At 610, the quiet mode module may discard the previously buffered trigger event of the same background task and buffer the current trigger event. Depending on the implementation, the buffering of the current trigger event may vary. For example, in some implementations, the current trigger event may be buffered in a queue in the same manner as the first trigger event of the background tasks (i.e., queued or pushed into the buffer normally). In other implementations, the current trigger event may be buffered in the same position in the buffer as the previously buffered and now discarded trigger event of the same background task (i.e., the current trigger event may replace the previously buffered trigger event at the same location in the buffer).

At 612, the previously buffered trigger event is unmodified and the quiet mode module 112 may buffer the current trigger event in the background task buffer 118. Following any of 604, 608, 610 or 612, the operations of 510 are complete, the process flow 500 of FIG. 5 may exit 510 and return to 506.

Figure 7:
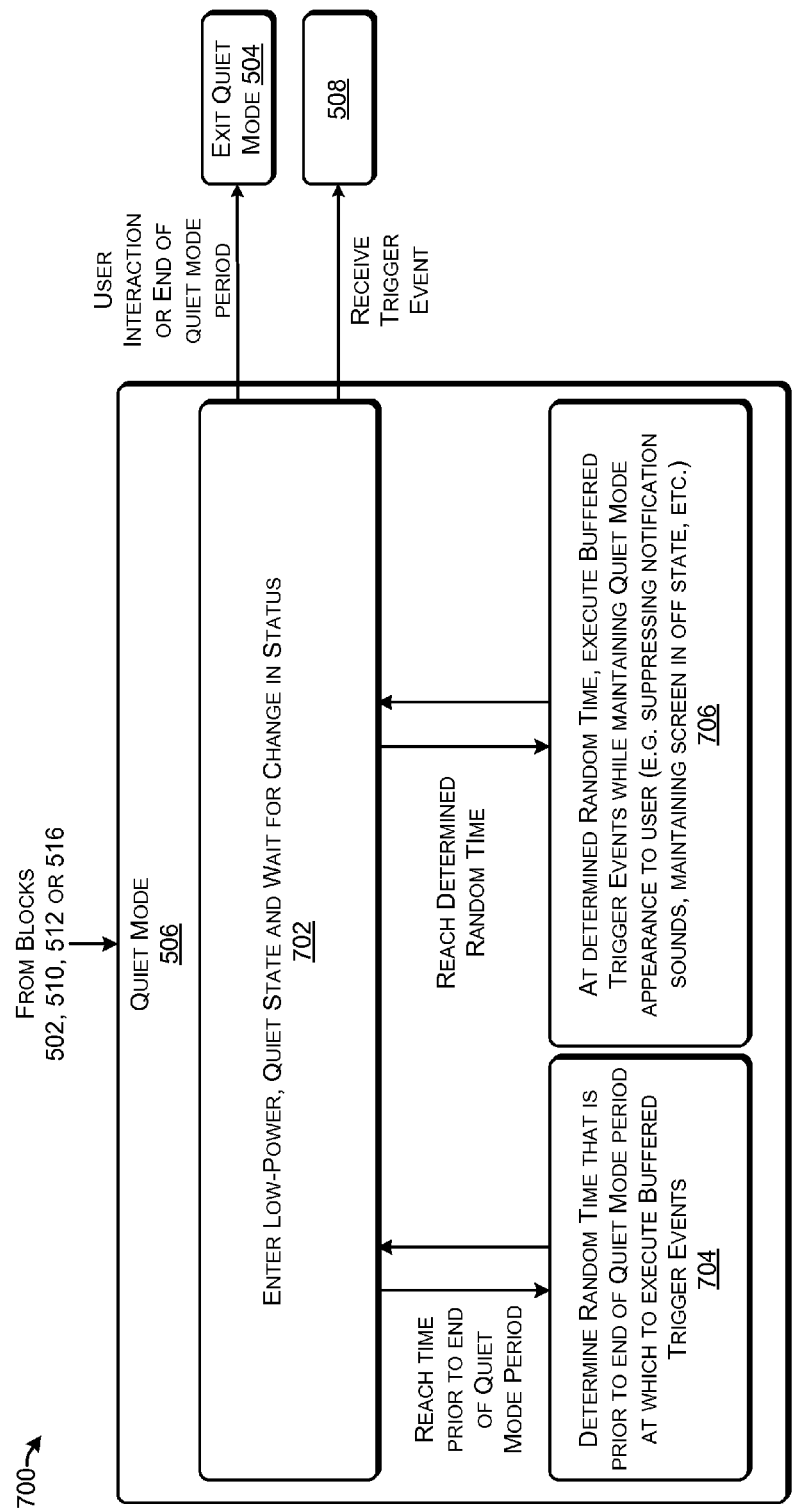
FIG. 7 illustrates an example process flow according to some implementations to allow a computing device in quiet mode to execute blocked trigger events prior to the end of a quiet mode time period.

FIG. 7 illustrates an example state diagram 700 according to some implementations. In particular, as mentioned above, FIG. 7 illustrates an example implementation for performing operations discussed with regard to 506 of FIG. 5. Specifically, the illustrated implementation of the operations of 506 shown in FIG. 7 provides operations of the quiet mode module 112 other than when trigger events are received or otherwise occur according to some implementations. More particularly, the operations specific to FIG. 7 relate to a technique for handling buffered trigger events as the quiet mode time period ends. The state diagram 700 is discussed below in the context of the user device 102 illustrated in FIGS. 1 and 2 or more generically in the context of a computing device. As shown in FIG. 7 and as discussed previously with regard to FIG. 5, the operations of 506 may begin after any of 502, 510, 512 or 516.

At 702, the quiet mode module 112 causes the user device 102 (or computing device) to enter a low-power, quiet state. For example, upon entering quiet mode, quiet mode module 112 may suppress additional background activity and/or interrupt and terminate currently executing background activity and turn off output devices (such as the display or speakers). Once in quiet mode, the quiet mode module 112 waits for change in status. As discussed with regard to FIG. 5, if user interaction occurs or the quiet mode time period ends, the quiet mode module exits quiet mode by moving to 504. If a trigger event is received or otherwise occurs, the quiet mode module 112 leaves 506 and moves to 508.

As mentioned above, the state diagram shown in FIG. 7 relates to handling buffered trigger events as the quiet mode time period ends. In particular, at some time prior to the end of the quiet mode time period, at 704, the quiet mode module determines a random time that is prior to the end of the quiet mode time period at which the buffered trigger event should be executed. Following this determination, the quiet mode module 112 moves back to state 702.

When the determined random time prior to the end of the quiet mode time period is reached, the quiet mode module 112 moves to 706. At 706, the quiet mode module may cause the buffered trigger events to be executed while maintaining the quiet mode appearance from the perspective of the user. For example, the quiet mode module may continue to suppress notification sounds and may maintain a display screen in an off state. This is because the quiet mode time period has not ended and, based on the settings, the device is intended to remain quiet. Once the buffered trigger events have been executed, the quiet mode module may return to state 702 until the quiet mode time period expires. Thus, at the end of the quiet mode time period, if a user interacts with the device, the device may appear fresh and as if the device has not been in a low-power state with background activity suppressed.

Of course, additional operations may be performed at 702. For example, depending on the amount of time between the determined random time and the end of the quiet mode time period, the treatment of trigger events received after the random time may vary. For example, in some implementations, the trigger events received after the determined random time may be blocked in buffered in the same fashion as if they were received before the determined random time. In other implementations, the trigger events received after the determined random time may be treated in the same way as buffered trigger events are treated at 706 (e.g. executed while maintaining the appearance of quiet mode). Also, as would be understood to one of ordinary skill in the art in view of this disclosure, the use of a random time is optional and is not a limitation on the implementations disclosed herein. For example, a set time prior to the end of the quiet mode time period may be used or a random time prior may be determined for all instances of quiet mode on a particular user device.

Moreover, the timing of the determination of a random time may vary from implementation to implementation. For example, the random time may be determined at the time of entry to the quiet mode or at the beginning of the quiet mode time period. These and other variations would be apparent to one of ordinary skill in the art in view of this disclosure.

Figure 8:
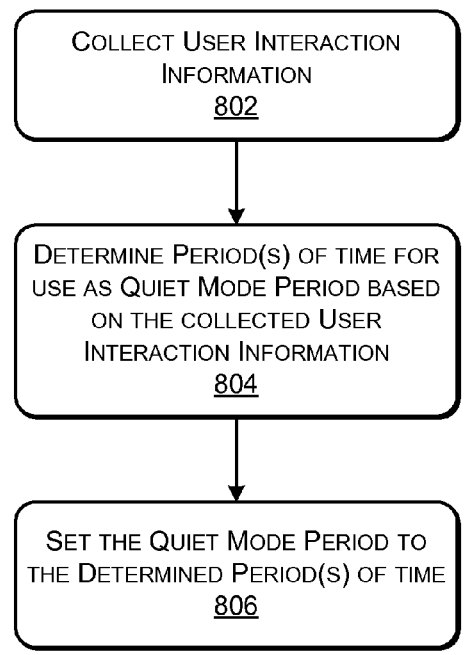
FIG. 8 illustrates an example process flow according to some implementations for determining a time period for a quiet mode on a computing device based on user interaction with the computing device.

FIG. 8 illustrates an example process flow 800 according to some implementations. In particular, FIG. 8 illustrates an example process flow for performing a determination of quiet mode time period(s) based on user interaction information. Specifically, the process of FIG. 8 may be utilized in an implementation in which, rather than or in addition to the user setting the time period to be used for the quiet mode time period (see 312 of FIG. 3), the quiet mode module 112 may analyze user interaction data to determine the time period(s) to be used. The process flow 600 is discussed below in the context of the user device 102 illustrated in FIGS. 1 and 2 or more generically in the context of a computing device.

At 802, the quiet mode module 112 may collect user interaction information. Depending on the implementation, the manner in which the user interaction information is collected may vary. For example, in some implementations, the user interaction information may be collected from an interaction logging component of the operating system component 206. The general interaction logging component may operate to log user actions and times of those interactions to create a history of user interactions with the computing system. In other implementations, the quiet mode module may include additional functionality to perform the function of collecting user interaction information outside of quiet mode.

At 804, the quiet mode module 112 determines a period or periods of time to use as the quiet mode time period(s) based on the collected user interaction information. As would be understood by one of ordinary skill in the art in view of this disclosure, the determination of the quiet mode time period from the user interaction information may be performed in any number of ways. For example, a threshold analysis may be performed based on an average usage at each given time period during the day to determine one or more windows of time of a certain length at which the user is likely to not be using the computing device. As mentioned above, many other ways of determining the period(s) may be used.

At 806, the quiet mode module 112 may set the quiet mode time period to the determined period(s) of time.

While several examples have been illustrated herein for discussion purposes, numerous other configurations may be used and thus implementations herein are not limited to any particular configuration or arrangement. For example, the discussion herein refers to trigger events of background task operations being blocked by the computing device where the background task operation is ultimately to be executed. This should not be taken as a limitation as such blocking need not be limited to the computing device where the background task operation is ultimately to be executed. For example, in a scenario in which instant messages are to be blocked during a quiet mode time period, the user device 102 may enter quiet mode, instruct a background task related servers for the instant messenger to block and buffer instant message notifications until notified by the user device 102 that the user device 102 has left the quiet mode.

Further, the discussion herein refers to data being sent and received by particular components or modules of a system. This should not be taken as a limitation as such communication need not be direct and the particular components or modules need not necessarily be single functional units. The communications could instead be relayed by a separate module upon receipt of the communication. Further, the components and/or modules may be combined or the functionality may be separated amongst modules in various manners not limited to those discussed above.

Other variations in the logical and practical structure and framework of various implementations would be apparent to one of ordinary skill in the art in view of the disclosure provided herein.

Further, the processes described herein are only examples provided for discussion purposes. Numerous other variations will be apparent to those of skill in the art in light of the disclosure herein. Further, while the disclosure herein sets forth several examples of suitable frameworks, architectures and environments for executing the techniques and processes herein, implementations herein are not limited to the particular examples shown and discussed.

CONCLUSION

Although the subject matter has been described in language specific to structural features and/or methodological acts, the subject matter defined in the appended claims is not limited to the specific features or acts described above. Rather, the specific features and acts described above are disclosed as example forms of implementing the claims. This disclosure is intended to cover any and all adaptations or variations of the disclosed implementations, and the following claims should not be construed to be limited to the specific implementations disclosed in the specification. Instead, the scope of this document is to be determined entirely by the following claims, along with the full range of equivalents to which such claims are entitled.

What is claimed is:

1. A computing system comprising:
   one or more processors;
   memory;
   a user interface module stored in the memory and executable by the one or more processors to:
   generate a user interface configured to accept input of settings for a low power mode of the computing system, the low power mode being a connected standby mode, the user interface including a background task interface configured to accept input of task-specific settings for the low power mode;
   a quiet mode module stored in the memory and executable by the one or more processors to:
   determine if conditions for the low power mode are satisfied;
   in response to determining that the conditions for the low power mode are satisfied, cause the computing system to enter the low power mode;
   during the low power mode, determine whether to block one or more trigger events from causing activation of one or more respective background task operations; and
   allow at least one trigger event of the one or more trigger events to cause an activation of a respective background task operation during the low power mode based at least in part on the determining whether to block the at least one allowed trigger event from causing activation of the respective background task operation.

2. The computing system of claim 1, wherein the quiet mode module is further executable by the one or more processors to:
   block at least one trigger event of the one or more trigger events from causing activation of at least one respective background task operation based at least in part on the determining whether to block the at least one blocked trigger event.

3. The computing system of claim 2, wherein the quiet mode module is further executable by the one or more processors to buffer at least one blocked trigger event in a trigger event buffer.

4. The computing system of claim 1, wherein the quiet mode module determines to allow an allowed trigger event to cause activation of the respective background task operation during the low power mode based at least in part on a background task related to the allowed trigger event and the respective background task operation.

5. The computing system of claim 1, wherein a condition of the conditions for the low-power mode comprises a time period and the quiet mode module determines the time period based at least in part on a history of user interaction with the computing system.

6. The computing system of claim 1, wherein one of the conditions for the low power mode comprises a threshold period of time during which no user interaction is detected.

7. The computing system of claim 1, wherein one of the conditions for the low power mode comprises a time of day being within a predefined quiet mode time period in a day.

8. The computing system of claim 1, wherein the user interface includes a select task interface configured to display information associated with one more tasks presented in the background task interface.

9. One or more computer storage media encoded with instructions that, when executed by one or more processors of a computing system, cause the one or more processors to perform acts comprising:
    entering a low power mode for a set period of time or until user interaction is detected;
    during the low power mode;
        determining whether to block one or more trigger events from causing an activation of one or more respective background task operations;
        blocking at least one trigger event of the one or more trigger events from causing an activation of a respective background task operation; and
        buffering the at least one trigger event in a trigger event buffer; and
    responsive to an end of the set period of time or detecting user interaction, exiting the low power mode and allowing the at least one trigger event in the trigger event buffer to cause the activation of the respective background task operation.

10. One or more computer storage computer media of claim 9, the acts further comprising:
    discarding a first blocked trigger event blocked from causing a first activation of another respective background task operation when a second blocked trigger event blocked from causing a second activation of the other respective background task operation is present in the trigger event buffer.

11. One or more computer storage media of claim 10, the acts further comprising:
    buffering the first blocked trigger event blocked from causing the first activation of the other respective background task operation when the second blocked trigger event blocked from causing the second activation of the other respective background task operation is already present in the trigger event buffer.

12. One or more computer storage media of claim 9, the acts further comprising:

for a first blocked trigger event blocked from causing a first activation of another respective background task operation, discarding a second blocked trigger event already present in the trigger event buffer where the second blocked trigger event was blocked from causing a second activation of the other respective background task operation; and
    buffering the first blocked trigger event in the trigger event buffer.

13. One or more computer storage media of claim 9, wherein at least one notification sound related to a respective background task operation of a blocked trigger event is suppressed when the computing system is in the low power mode.

14. One or more computer storage media of claim 9, wherein a first allowed trigger event causes the computing system to leave the low-power mode when the respective background task operation is activated; and
    a second allowed trigger event is prevented from causing the computing system to leave the low-power mode when the respective background operation is activated.

15. One or more computer storage media of claim 9, the acts further comprising
    determining a time occurring prior to the end of the set period of time and allowing one or more buffered trigger events to cause the activation of one or more respective background task operations the buffered trigger events were blocked from activating without leaving the low power mode.

16. A computer implemented method comprising:
    under control of one or more computer systems comprising one or more processors and memory, the memory storing executable instructions,
    during an instance of a quiet mode for at least one of the computer systems, determining, for each of a plurality of trigger events, whether to block the trigger event from causing activation of one or more respective background task operations, a first respective background task operation that corresponds to a first trigger event of the plurality of trigger events being a first type of a plurality of types of background task operations, a second respective background task operation that corresponds to a second trigger event of the plurality of trigger events being a second type of background task operation of the plurality of types of background task operations;
    blocking a trigger event of the plurality of trigger events from causing an activation of a respective background task operation based at least in part on the determining whether to block the blocked trigger event;
    buffering the blocked trigger event in a trigger event buffer; and
    determining a time occurring prior to the end of the instance of the quiet mode and allowing, at the determined time, one or more buffered trigger events to cause the activation of one or more respective background task operations the buffered trigger events were blocked from activating without leaving the quiet mode.

17. The computer implemented method of claim 16, wherein the determining whether to block a trigger event of the plurality of trigger events is based at least in part on a user setting related to a respective background task operation.

18. The computer implemented method of claim 16, further comprising:
    causing a computer system of the one or more computer systems to leave the instance of the quiet mode at an end of a quiet mode time period.

19. The computer implemented method of claim 16, further comprising:
- discarding a first blocked trigger event blocked from causing a first activation of a first respective background task operation when a second blocked trigger event blocked from causing a second activation of the first respective background task operation is present in the trigger event buffer;
- for a third blocked trigger event blocked from causing a first activation of a second respective background task operation, discarding a fourth blocked trigger event already present in the trigger event buffer where the fourth blocked trigger event was blocked from causing a second activation of the third respective background task operation and buffering the third blocked trigger event in the trigger event buffer; and
- buffering a fifth blocked trigger event blocked from causing a first activation of a third respective background task operation when a sixth blocked trigger event blocked from causing a second activation of the third respective background task operation is already present in the trigger event buffer.

* * * * *